US012109584B2

(12) United States Patent
Nakamura et al.

(10) Patent No.: US 12,109,584 B2
(45) Date of Patent: Oct. 8, 2024

(54) RECTIFYING DEVICE, COATING APPARATUS, COATING METHOD, AND PHOTOCONDUCTOR MANUFACTURING METHOD

(71) Applicant: FUJIFILM Business Innovation Corp., Tokyo (JP)

(72) Inventors: Akihiko Nakamura, Kanagawa (JP); Takaakira Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 103 days.

(21) Appl. No.: 17/721,769

(22) Filed: Apr. 15, 2022

(65) Prior Publication Data

US 2022/0362795 A1 Nov. 17, 2022

(30) Foreign Application Priority Data

May 12, 2021 (JP) ................................ 2021-080893
Jan. 21, 2022 (JP) ................................ 2022-008126

(51) Int. Cl.

| | |
|---|---|
| ***B05C 3/20*** | (2006.01) |
| ***B05C 3/18*** | (2006.01) |
| ***B05D 1/18*** | (2006.01) |
| ***B05D 1/26*** | (2006.01) |
| ***B05D 7/14*** | (2006.01) |
| ***G03G 15/00*** | (2006.01) |
| *B05D 3/02* | (2006.01) |

(52) U.S. Cl.

CPC .................. *B05C 3/20* (2013.01); *B05C 3/18* (2013.01); *B05D 1/18* (2013.01); *B05D 1/26* (2013.01); *B05D 7/146* (2013.01); *G03G 15/751* (2013.01); *B05D 3/0254* (2013.01)

(58) Field of Classification Search

None

See application file for complete search history.

(56) References Cited

U.S. PATENT DOCUMENTS 5,707,449 A * 1/1998 Ohira ...................... B05C 5/007 118/419
5,849,454 A * 12/1998 Tada ......................... B05C 3/12 118/419
2019/0294073 A1* 9/2019 Kinuta ............... G03G 15/0233

FOREIGN PATENT DOCUMENTS

JP 4-274436 A 9/1992

* cited by examiner

*Primary Examiner* — Binu Thomas
(74) *Attorney, Agent, or Firm* — Sughrue Mion, PLLC

(57) ABSTRACT

A rectifying device including a first flow channel member provided between an inner peripheral wall and an outer peripheral wall; a second flow channel member provided upstream of the first flow channel in a flowing direction of the fluid and being connected with the first flow channel along an entire circumference. The device includes an inflow section at the second flow channel member for fluid to flow into a circumferential area of the second flow channel; a first guide wall in the second flow channel at a position away from the inflow section in a circumferential direction and to guide the fluid flowing toward a first side in the circumferential direction through the second flow channel toward the first flow channel; and a second guide wall in the second flow channel adjacent the first guide wall in the circumferential direction.

10 Claims, 11 Drawing Sheets

RECTIFYING DEVICE, COATING APPARATUS, COATING METHOD, AND PHOTOCONDUCTOR MANUFACTURING METHOD

CROSS-REFERENCE TO RELATED APPLICATIONS

This application is based on and claims priority under 35 USC 119 from Japanese Patent Application No. 2021-080893 filed May 12, 2021 and Japanese Patent Application No. 2022-008126 filed Jan. 21, 2022.

BACKGROUND

(i) Technical Field

The present disclosure relates to rectifying devices, coating apparatuses, coating methods, and photoconductor manufacturing methods.

(ii) Related Art

Japanese Unexamined Patent Application Publication No. 4-274436 discloses a photoconductor manufacturing apparatus that provides a bypass channel for connecting areas within an annular liquid accumulation chamber in an annular coating device and that has a coating-liquid pressure feeder at an intermediate point of the bypass channel. The annular coating device is configured to annularly surround a target coating body having a cylindrical outer peripheral surface and apply a coating liquid to the outer peripheral surface of the target coating body while continuously moving the target coating body in the longitudinal direction thereof. The annular coating device includes the liquid accumulation chamber, a feed port for feeding the coating liquid to an area of the liquid accumulation chamber from the outside, and a slit facing the interior of the liquid accumulation chamber.

SUMMARY

Aspects of non-limiting embodiments of the present disclosure relate to a rectifying device, a coating apparatus, a coating method, and a photoconductor manufacturing method that suppress a disturbance in the flow at a location where a fluid flowing along a first guide wall and a fluid flowing along a second guide wall merge with each other, as compared with a case where a closed end opposite a first flow channel in a second flow channel has a flat shape extending along a plane perpendicular to an axis.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a rectifying device including: a first flow channel member that has an annular first flow channel through which a fluid flows in an axial direction, the first flow channel being provided between an inner peripheral wall and an outer peripheral wall; a second flow channel member that has a second flow channel between the inner peripheral wall and the outer peripheral wall, the second flow channel being provided upstream of the first flow channel in a flowing direction of the fluid and being connected with the first flow channel along an entire circumference; an inflow section that is provided at the second flow channel member and that allows the fluid to flow into a circumferential area of the second flow channel located away from the first flow channel in the axial direction; a first guide wall that is provided within the second flow channel at a position located away from the inflow section in a circumferential direction and that guides the fluid flowing toward a first side in the circumferential direction through the second flow channel toward the first flow channel; and a second guide wall that is provided within the second flow channel at a position adjacent to the first guide wall in the circumferential direction, the second guide wall guiding the fluid flowing toward a second side in the circumferential direction through the second flow channel toward the first flow channel and being disposed in a direction intersecting the first guide wall.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below. In the following description, a direction indicated by an arrow UP appropriately shown in each drawing is defined as an upper side in the vertical direction of an apparatus.

First Exemplary Embodiment

Overall Configuration of Coating Apparatus

Figure 1:
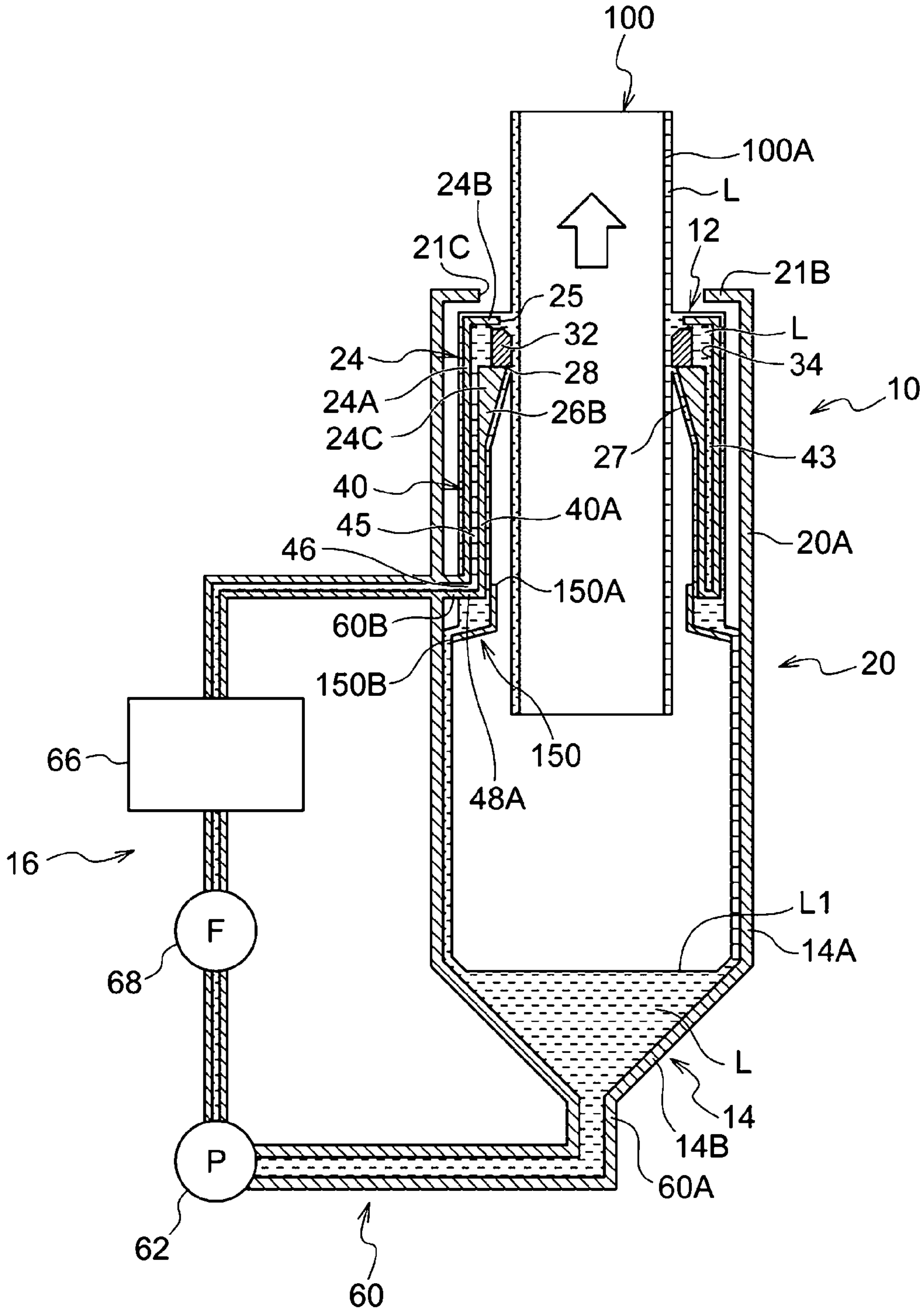
FIG. 1 is a cross-sectional view schematically illustrating the overall configuration of a coating apparatus equipped with a rectifying device according to a first exemplary embodiment.

FIG. 1 is a cross-sectional view illustrating an example of a coating apparatus 10 equipped with a rectifying device 40 according to a first exemplary embodiment.

As shown in FIG. 1, the coating apparatus 10 applies a coating liquid L to an outer peripheral surface 100A of a cylindrical body 100. The coating apparatus 10 includes a coating liquid retainer 12 that retains the coating liquid L, and also includes the rectifying device 40 that is disposed upstream of the coating liquid retainer 12 in the flowing direction of the coating liquid L and that rectifies the flow of the coating liquid L. Moreover, the coating apparatus 10 includes a container 14 that accommodates the coating liquid L falling from the coating liquid retainer 12, and also includes a circulator 16 that causes the coating liquid L in the container 14 to circulate to the coating liquid retainer 12. The coating apparatus 10 also includes a tubular housing 20 that supports the coating liquid retainer 12. The coating liquid L is an example of a fluid.

Cylindrical Body

The cylindrical body 100 is a metallic cylindrical member or is formed by wrapping a metallic endless-belt-like member around a cylindrical core. The cylindrical member or the endless-belt-like member constituting the cylindrical body 100 is, for example, an electrophotographic photoconductor base. Furthermore, for example, in a case where an electrophotographic photoconductor base is to be used as the cylindrical body 100, the coating liquid L used is a liquid containing a photoconductive material. In this exemplary embodiment, the coating apparatus 10 applies the coating liquid L to the cylindrical member or the endless-belt-like member constituting the cylindrical body 100. By using a liquid containing a photoconductive material as the coating liquid L, an electrophotographic photoconductor may be manufactured.

Housing

As shown in FIG. 1, the housing 20 is formed of a cylindrical member and is disposed such that the axial direction of the housing 20 is aligned with the vertical direction. For example, the housing 20 includes a cylindrical section 20A disposed in the vertical direction.

The upper end of the cylindrical section 20A is provided with an upper wall 21B that extends radially inward, and the upper wall 21B is provided with a circular opening 21C. The inner diameter of the opening 21C is larger than the outer diameter of the cylindrical body 100. The cylindrical body 100 is configured to extend in the axial direction through the opening 21C of the upper wall 21B.

Coating Liquid Retainer

Figure 2:
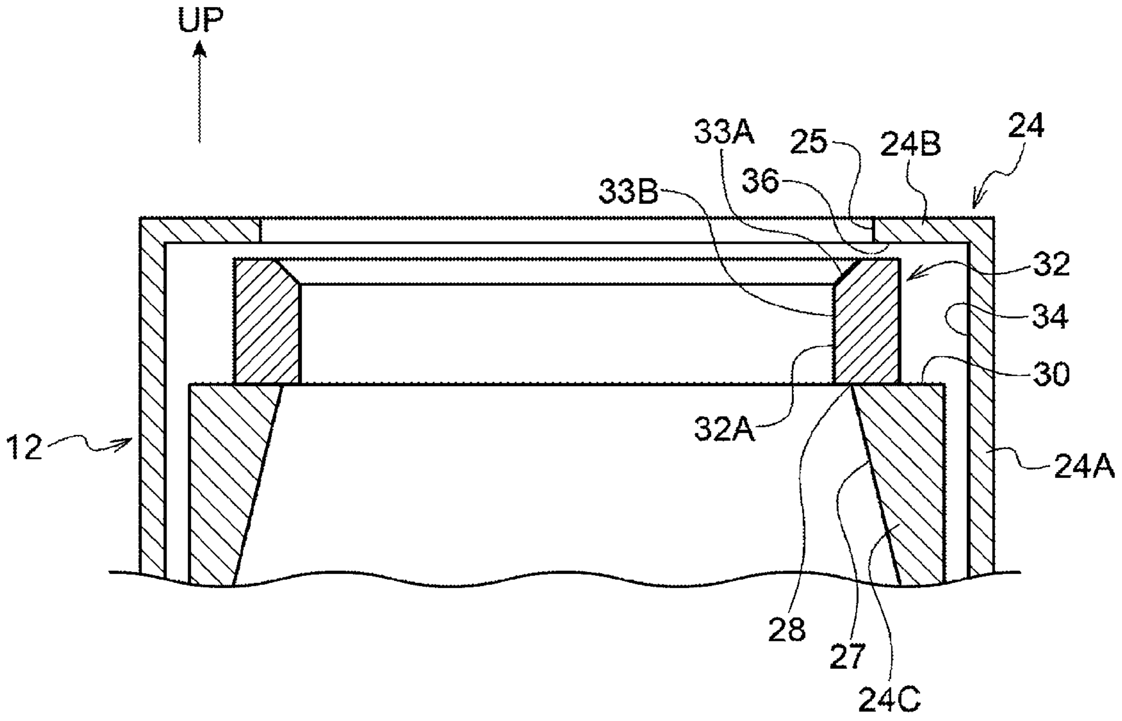
FIG. 2 is a partially-enlarged cross-sectional view of a coating liquid retainer used in the coating apparatus equipped with the rectifying device according to the first exemplary embodiment.

As shown in FIGS. 1 and 2, the coating liquid retainer 12 has a function of retaining the coating liquid L fed from the circulator 16. The coating liquid retainer 12 extends upward in the vertical direction continuously from an upper portion of the rectifying device 40. The coating liquid retainer 12 includes a casing 24. The casing 24 includes a cylindrical section 24A, an upper wall 24B bent radially inward from the upper end of the cylindrical section 24A, and a block section 24C provided below the cylindrical section 24A.

The cylindrical section 24A is disposed such that the axial direction thereof is aligned with the vertical direction. The upper wall 24B is provided with a circular upper opening 25 (see FIG. 2). The inner diameter of the upper opening 25 is larger than the outer diameter of the cylindrical body 100. The cylindrical body 100 is configured to extend in the axial direction through the upper opening 25 of the upper wall 24B.

The block section 24C is tubular and includes a tubular wall 26B disposed radially inward of the cylindrical section 24A. The wall 26B of the block section 24C is connected with an inner peripheral wall 40A, to be described later, of the rectifying device 40. The inner surface of the wall 26B is provided with a slope 27 having a rising gradient toward the radially inner side. The upper end of the slope 27 is provided with a circular lower opening 28. The inner diameter of the lower opening 28 is larger than the outer diameter of the cylindrical body 100. Moreover, the inner diameter of the lower opening 28 is smaller than the inner diameter of the upper opening 25. The cylindrical body 100 is configured to extend in the axial direction through the lower opening 28 in the wall 26B of the block section 24C.

The coating liquid retainer 12 is supported by a supporter (not shown) inside the housing 20 at the upper side thereof in the vertical direction.

The casing 24 includes the cylindrical section 24A, the upper wall 24B, and the block section 24C, such that the upper side of the block section 24C has an opening at the radially inner side. An upper portion of the block section 24C is provided with an installation surface 30. An annular body 32 is disposed on the installation surface 30 in a relatively shiftable manner. The installation surface 30 is flat and extends horizontally.

In the casing 24, a flow channel 34 through which the coating liquid L flows is provided between the cylindrical section 24A and the block section 24C, as well as between the cylindrical section 24A and the annular body 32.

The cylindrical body 100 extends through the upper opening 25 and the lower opening 28 in the coating liquid retainer 12. The cylindrical body 100 is configured to move vertically relative to the coating liquid retainer 12 (see FIGS. 5A to 5C). The installation surface 30 is disposed to extend in a direction intersecting the relative movement direction of the cylindrical body 100.

The inner diameter of the annular body 32 is larger than the outer diameter of the cylindrical body 100. For example, the inner diameter of the annular body 32 is smaller than the inner diameter of the lower opening 28. In a state where the annular body 32 is disposed on the installation surface 30, the cylindrical body 100 extends in the axial direction through the annular body 32. For example, the annular body 32 is disposed in a state where the coating liquid L is interposed between the annular body 32 and the installation surface 30 at the upper portion of the block section 24C. In a state where the coating liquid L is interposed between the annular body 32 and the installation surface 30, the annular body 32 is movable (i.e., slidable in this exemplary embodiment) relative to the installation surface 30. In this exemplary embodiment, a driver that directly drives the annular body 32 is not provided, and the annular body 32 autonomously slides relative to the installation surface 30.

As shown in FIG. 2, a slit-like discharge section 36 extends in the circumferential direction between the upper opening 25 of the upper wall 24B and the annular body 32 in the coating liquid retainer 12. The coating liquid L is to be discharged from the discharge section 36. The coating liquid L discharged from the discharge section 36 overflows by flowing toward the upper surface of the upper wall 24B from the upper opening 25, and also flows downward through between the annular body 32 and the outer peripheral surface 100A of the cylindrical body 100 (see FIG. 1). Specifically, as the annular body 32 moves relative to the cylindrical body 100, the coating liquid L retained by the coating liquid retainer 12 flows in from the upper side and flows out from the lower side.

Figures 5A, 5B, 5C:
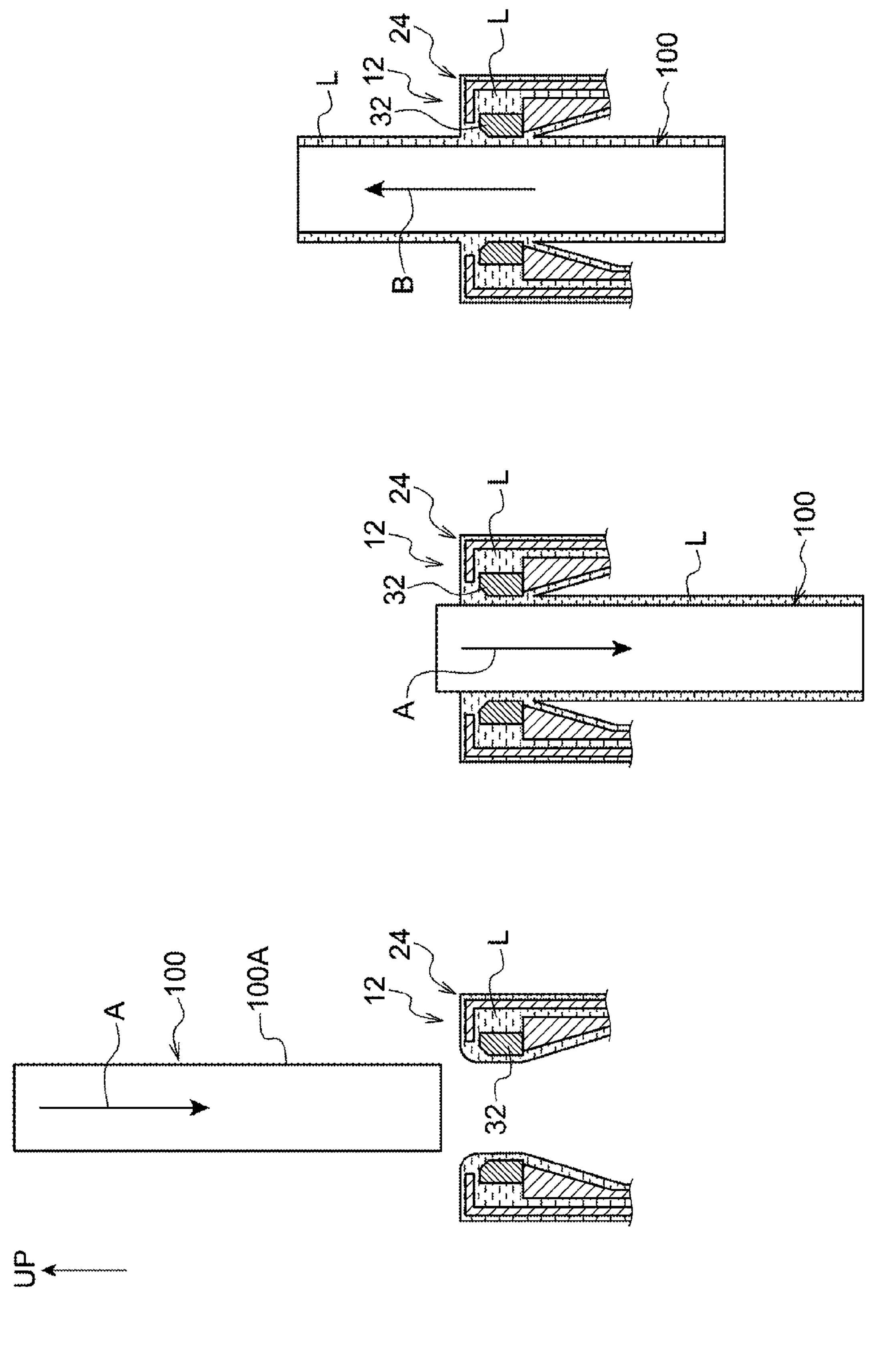
FIG. 5A illustrates a state before a cylindrical body is inserted into the coating liquid retainer of the coating apparatus.
FIG. 5B illustrates a state where the cylindrical body is inserted and moved downward into the coating liquid retainer of the coating apparatus.
FIG. 5C illustrates a state where the cylindrical body is being moved upward in the vertical direction relative to the coating liquid retainer.

In the coating apparatus 10, the cylindrical body 100 is moved vertically upward relative to the coating liquid retainer 12, so that the coating liquid L is applied to the outer peripheral surface 100A of the cylindrical body 100 (see FIGS. 5B and 5C). In the coating liquid retainer 12, the coating liquid L flows into between the outer peripheral surface 100A of the cylindrical body 100 and an inner peripheral surface 32A of the annular body 32, so that the annular body 32 is shifted relative to the installation surface 30 by the flow pressure of the coating liquid L. In this case, the annular body 32 shifts relative to the installation surface 30 such that a gap between the outer peripheral surface 100A of the cylindrical body 100 and the inner peripheral surface 32A of the annular body 32 is uniform in the circumferential direction.

As shown in FIG. 2, the inner peripheral surface 32A of the annular body 32 is provided with a slope surface 33A disposed at the upper side and having a falling gradient from the upper opening 25 side, and a straight portion 33B extending straight in the vertical direction from the lower end of the slope surface 33A.

FIGS. 5A to 5C illustrate an example of a method of how the coating liquid retainer 12 of the coating apparatus 10 applies the coating liquid L to the outer peripheral surface 100A of the cylindrical body 100. As shown in FIG. 5A, the cylindrical body 100 is inserted into the coating liquid retainer 12 in the axial direction from above, and the cylindrical body 100 is moved downward (i.e., in a direction indicated by an arrow A). As shown in FIG. 5B, the cylindrical body 100 is moved further downward in the direction of the arrow A, and the coating liquid L is fed to the coating liquid retainer 12 by the circulator 16 (see FIG. 1), so that the space between the annular body 32 of the coating liquid retainer 12 and the outer peripheral surface 100A of the cylindrical body 100 is filled with the coating liquid L. Then, the cylindrical body 100 reaches the lowermost point, whereby the upper axial end of the cylindrical body 100 is disposed at a position facing the coating liquid retainer 12.

Subsequently, as shown in FIG. 5C, the cylindrical body 100 is moved upward (i.e., in a direction indicated by an arrow B) relative to the coating liquid retainer 12. In this case, the coating liquid L is discharged from the discharge section 36 such that the coating liquid L overflows from the upper side of the coating liquid retainer 12. Accordingly, the coating liquid L flows out downward from the lower opening 28, so that the coating liquid L is applied to the outer peripheral surface 100A of the cylindrical body 100 located higher than the upper opening 25, whereby a coating film 102 (see FIG. 6B) is formed on the outer peripheral surface 100A of the cylindrical body 100. The method for applying the coating liquid L to the outer peripheral surface 100A of the cylindrical body 100 in FIGS. 5A to 5C is an example, and the coating method is changeable.

Figure 6A:
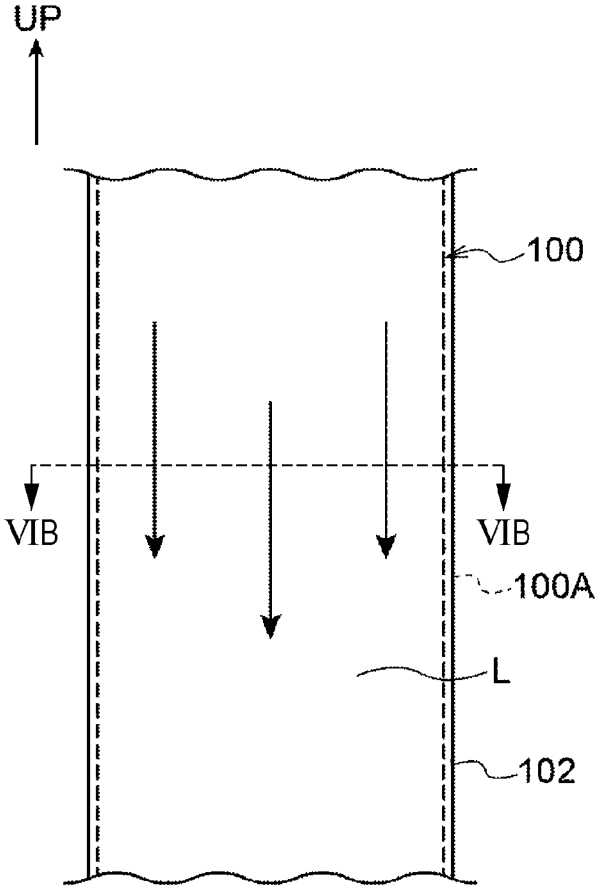
FIG. 6A is a side view illustrating a portion of the cylindrical body having a coating film formed thereon as a result of applying the coating liquid onto the outer peripheral surface of the cylindrical body.
Figure 6B:
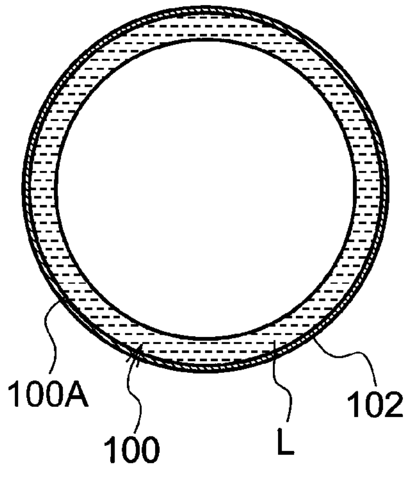
FIG. 6B is a cross-sectional view taken along line VIB-VIB in FIG. 6A.

As shown in FIG. 6A, in the process of applying the coating liquid L to the outer peripheral surface 100A of the cylindrical body 100, the coating liquid L applied to the outer peripheral surface 100A of the cylindrical body 100 falls downward along the outer peripheral surface 100A of the cylindrical body 100.

Furthermore, as shown in FIG. 1, in the coating apparatus 10, a wall 150 is provided below the coating liquid retainer 12 inside the housing 20. The wall 150 is provided with an opening 150A through which the cylindrical body 100 extends. The lower end of the wall 150 in the diagonal direction is provided with a hole 150B disposed at a position adjacent to the inner wall surface of the housing 20. Accordingly, the coating liquid L falls downward along the inner wall surface of the housing 20 from the hole 150B in the wall 150, and the coating liquid L is collected by the container 14.

Overall Configuration of Rectifying Device

Figure 3:
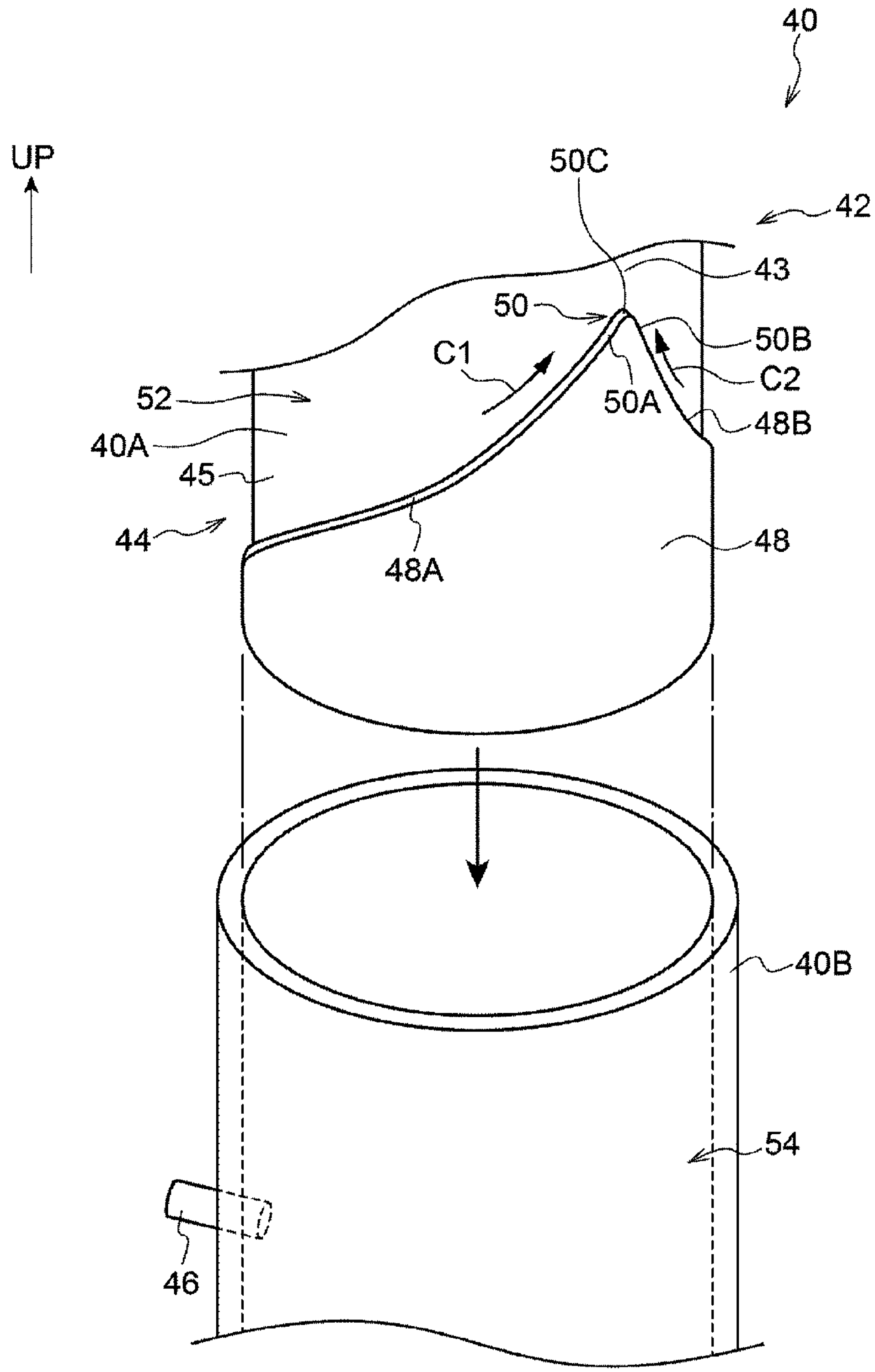
FIG. 3 is an exploded perspective view illustrating an inner tube and an outer tube constituting the rectifying device according to the first exemplary embodiment.

As shown in FIGS. 1 and 3, the rectifying device 40 is disposed upstream of the coating liquid retainer 12 in the flowing direction of the coating liquid L, and has a function of rectifying the flow of the coating liquid L to cause the coating liquid L to flow into the coating liquid retainer 12. In this exemplary embodiment, the rectifying device 40 is provided below the coating liquid retainer 12 in the vertical direction and extends continuously from the coating liquid retainer 12.

As shown in FIG. 3, the rectifying device 40 includes a first flow channel member 42 and a second flow channel member 44 provided upstream of the first flow channel member 42 in the flowing direction of the coating liquid L. The rectifying device 40 includes an inflow section 46 that is provided in the second flow channel member 44 and into which the coating liquid L flows. The rectifying device 40 also includes the inner peripheral wall 40A and an outer peripheral wall 40B disposed at the outer side of the inner peripheral wall 40A. The upstream side or the downstream side in the flowing direction of the coating liquid L may sometimes be simply referred to as “upstream side” and “downstream side” by removing the expression “in the flowing direction of the coating liquid L” therefrom.

First Flow Channel Member

As shown in FIG. 3, the first flow channel member 42 is disposed at the upper side in the vertical direction, and an upper portion of the first flow channel member 42 is connected with the coating liquid retainer 12 (see FIG. 1). Upper portions of the inner peripheral wall 40A and the outer peripheral wall 40B serve as a part of the first flow channel member 42. The first flow channel member 42 includes an annular first flow channel 43 that is provided between the inner peripheral wall 40A and the outer peripheral wall 40B and through which the coating liquid L flows in the axial direction. Specifically, the coating liquid retainer 12 is provided at the downstream side in the first flow channel 43 of the first flow channel member 42 in the flowing direction of the coating liquid L, and the annular first flow channel 43 and the annular flow channel 34 in the coating liquid retainer 12 (see FIG. 1) are connected with each other in the axial direction.

Second Flow Channel Member and Inflow Section

As shown in FIG. 3, the second flow channel member 44 is disposed below the first flow channel member 42 in the vertical direction and extends continuously therefrom. Specifically, the second flow channel member 44 is connected with the lower side of the first flow channel member 42 in the vertical direction. Lower portions of the inner peripheral wall 40A and the outer peripheral wall 40B serve as a part of the second flow channel member 44. The second flow channel member 44 includes a second flow channel 45 that is provided between the inner peripheral wall 40A and the outer peripheral wall 40B and that connects with the first flow channel 43 along the entire circumference. The second flow channel 45 is provided upstream of the first flow channel 43 in the flowing direction of the coating liquid L.

The second flow channel member 44 includes a protrusion 48 protruding radially outward from the outer peripheral surface of the inner peripheral wall 40A. The protrusion 48 is partially disposed below the inflow section 46. The inflow section 46 is provided in a circumferential area of the second flow channel 45 that is located away from the first flow channel 43 in the axial direction. The coating liquid L flows into the second flow channel 45 from the inflow section 46. For example, the inflow section 46 is a cylindrical tube, and one axial end of the tube is connected with the outer peripheral wall 40B.

The second flow channel member 44 includes a bottom wall 48A extending toward a first side in the circumferential direction from the inflow section 46. The second flow channel 45 is provided above the bottom wall 48A. In this exemplary embodiment, the bottom wall 48A is provided at an upper portion of the protrusion 48, extends radially outward from the inner peripheral wall 40A, and serves as the bottom of the circumferential area of the second flow channel 45. The bottom wall 48A is disposed to have a rising gradient toward the first side in the circumferential direction from the inflow section 46. For example, the bottom wall 48A is curved such that the inclination angle thereof relative to the horizontal direction varies. In this exemplary embodiment, at least the upper side of the bottom wall 48A has an increasing inclination angle relative to the horizontal direction with increasing distance from the inflow section 46. Accordingly, the coating liquid L flowing in from the inflow section 46 flows through the second flow channel 45 above the bottom wall 48A toward the first side in the circumferential direction (i.e., in a direction indicated by an arrow C1).

A first guide wall 50A that guides the coating liquid L flowing toward the first side in the circumferential direction (i.e., the direction of the arrow C1) through the second flow channel 45 toward the first flow channel 43 is provided in the second flow channel 45 at a position located away from the inflow section 46 in the circumferential direction. The first guide wall 50A serves as a part of the upper edge of the bottom wall 48A and is disposed at the downstream end in the flowing direction of the coating liquid L.

The second flow channel member 44 includes a bottom wall 48B extending toward a second side in the circumferential direction from the inflow section 46. The second flow channel 45 is provided above the bottom wall 48B. In this exemplary embodiment, the bottom wall 48B is provided at the upper portion of the protrusion 48, extends radially outward from the inner peripheral wall 40A, and serves as the bottom of the circumferential area of the second flow channel 45. The bottom wall 48B is disposed to have a rising gradient toward the second side in the circumferential direction from the inflow section 46. For example, the bottom wall 48B is curved such that the inclination angle thereof relative to the horizontal direction varies. In this exemplary embodiment, at least the upper side of the bottom wall 48B has an increasing inclination angle relative to the horizontal direction with increasing distance from the inflow section 46. For example, the bottom wall 48B is symmetric with the bottom wall 48A in the direction orthogonal to the axial direction of the rectifying device 40. Accordingly, the coating liquid L flowing in from the inflow section 46 flows through the second flow channel 45 above the bottom wall 48B toward the second side in the circumferential direction (i.e., in a direction indicated by an arrow C2).

A second guide wall 50B that guides the coating liquid L flowing toward the second side in the circumferential direction (i.e., the direction of the arrow C2) through the second flow channel 45 toward the first flow channel 43 is provided in the second flow channel 45 at a position located away from the inflow section 46 in the circumferential direction. The second guide wall 50B serves as a part of the upper edge of the bottom wall 48B and is disposed at the downstream end in the flowing direction of the coating liquid L. The second guide wall 50B is provided adjacent to the first guide wall 50A in the circumferential direction within the second flow channel 45. The second guide wall 50B extends in a direction intersecting the first guide wall 50A.

Specifically, the rectifying device 40 is provided with a single inflow section 46, a single first guide wall 50A, and a single second guide wall 50B. In the rectifying device 40, the coating liquid L flowing in from the inflow section 46 and flowing toward the first side in the circumferential direction (i.e., the direction of the arrow C1) through the second flow channel 45 is guided to the first guide wall 50A. Moreover, in the rectifying device 40, the coating liquid L flowing in from the inflow section 46 and flowing toward the second side in the circumferential direction (i.e., the direction of the arrow C2) through the second flow channel 45 is guided to the second guide wall 50B.

The downstream ends of the first guide wall 50A and the second guide wall 50B in the flowing direction of the coating liquid L serve as a merging section 50 for the coating liquid L. The merging section 50 is provided with a connection end 50C where the first guide wall 50A and the second guide wall 50B connect with each other. The connection end 50C has a curved shape with a radius smaller than 2.5 mm (see FIG. 4). In the rectifying device 40, the coating liquid L flowing toward the first side in the circumferential direction (i.e., the direction of the arrow C1) through the second flow channel 45 and the coating liquid L flowing toward the second side in the circumferential direction (i.e., the direction of the arrow C2) through the second flow channel 45 merge at the merging section 50. In this exemplary embodiment, the first guide wall 50A and the second guide wall 50B intersect with each other, as viewed from a direction orthogonal to the axial direction of the rectifying device 40, and are disposed to form an upward protruding shape. The connection end 50C is provided at a 180° position from the inflow section 46 in the circumferential direction of the second flow channel member 44.

Figure 4:
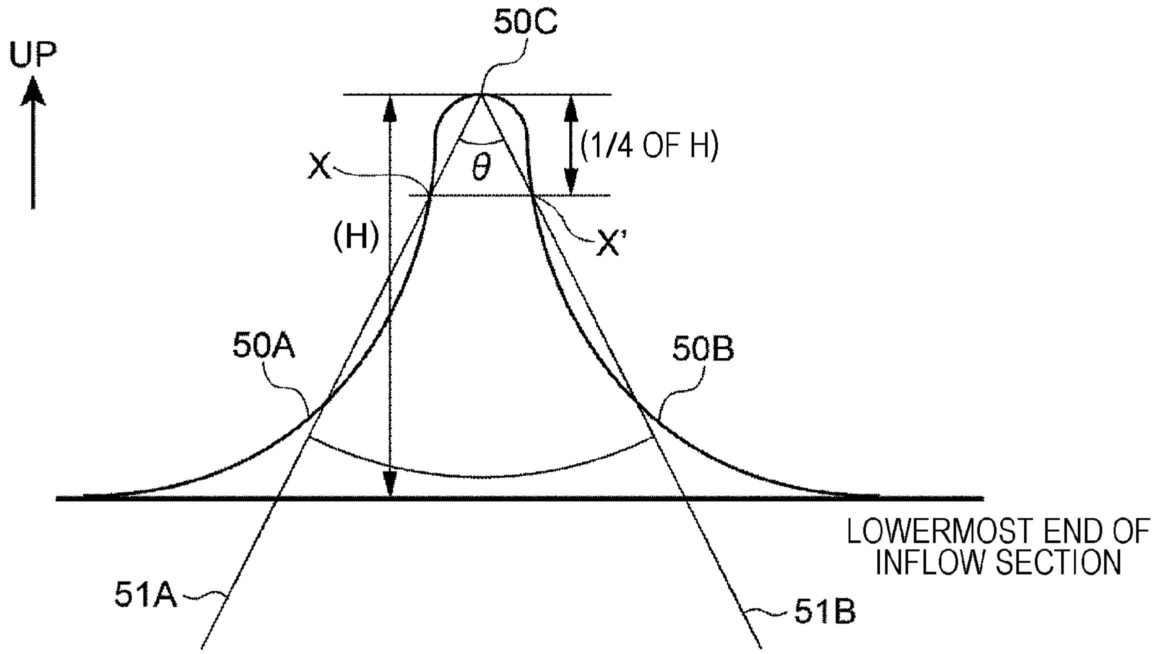
FIG. 4 is a front view illustrating an area surrounding a connection end where a first guide wall and a second guide wall used in the rectifying device according to the first exemplary embodiment connect with each other.

As shown in FIG. 4, an angle formed between lines 51A and 51B is defined as θ. The line 51A connects the connection end 50C, where the first guide wall 50A and the second guide wall 50B connect with each other, to a point X on the first guide wall 50A at a position corresponding to ¼ of a height H from the connection end 50C to the lowermost end of the inflow section 46. The line 51B connects the connection end 50C to a point X' on the second guide wall 50B at a position corresponding to ¼ of the height H from the connection end 50C to the lowermost end of the inflow section 46. In other words, this angle θ is formed between the lines 51A and 51B that connect the connection end 50C, where the first guide wall 50A and the second guide wall 50B connect with each other, to the point X on the first guide wall 50A and the point X' on the second guide wall 50B, respectively, at positions lower in height by ¼ of the height H from the connection end 50C to the lowermost end of the inflow section 46. In this case, the angle θ is desirably 40° or smaller, more desirably 30° or smaller, and even more desirably 10° or smaller. In this exemplary embodiment, the angle θ is set to, for example, 10°.

As shown in FIG. 3, the rectifying device 40 includes, for example, a cylindrical inner tube 52 serving as the inner peripheral wall 40A, and the protrusion 48 integrated with the outer peripheral surface of the inner tube 52. Moreover, the rectifying device 40 includes a cylindrical outer tube 54 into which the inner tube 52 is fitted and that serves as the outer peripheral wall 40B. The upper portion of the protrusion 48 is provided with the first guide wall 50A and the second guide wall 50B. Specifically, the first guide wall 50A and the second guide wall 50B protrude radially outward from the inner tube 52. In this exemplary embodiment, the inner tube 52 integrally provided with the protrusion 48 is fitted into the outer tube 54 at the time of manufacture of the rectifying device 40. In the state where the inner tube 52 is fitted in the outer tube 54, the protrusion 48 is in contact with the inner peripheral surface of the outer tube 54. As a result of the outer surface of the protrusion 48 and the inner surface of the outer tube 54 being joined together, the rectifying device 40 is manufactured. Accordingly, the first flow channel 43 of the first flow channel member 42 is formed between the inner tube 52 and the outer tube 54, and the second flow channel 45 of the second flow channel member 44 is formed between the inner tube 52 and the outer tube 54. The rectifying device 40 includes the inflow section 46 provided in the outer tube 54. For example, one axial end of the cylindrical inflow section 46 is connected with the outer tube 54.

Container

As shown in FIG. 1, the container 14 is provided at a lower portion of the housing 20 in the vertical direction. For example, the container 14 is connected with the lower end of the cylindrical section 20A of the housing 20.

The container 14 includes a cylindrical section 14A connecting with the cylindrical section 20A, and also includes a recess 14B that is disposed below the cylindrical section 14A and whose bottom surface is recessed into a valley-like shape. In this exemplary embodiment, the bottom surface of the recess 14B is recessed into an inverted cone shape whose inner diameter gradually decreases toward the lower side.

The recess 14B has an inclined bottom surface with a falling gradient from the cylindrical section 14A toward the center in the radial direction, such that the center of the recess 14B serves as the lowermost portion. The coating liquid L falling downward from the coating liquid retainer 12 accumulates in the recess 14B of the container 14. For example, a liquid surface L1 of the coating liquid L is located at the upper side of the recess 14B.

Circulator

As shown in FIG. 1, the circulator 16 includes a feed pipe 60 that feeds the coating liquid L in the container 14 to the rectifying device 40, and also includes a pump 62 provided at an intermediate point of the feed pipe 60. The pump 62 transports the coating liquid L in the feed pipe 60 from the container 14 toward the rectifying device 40.

An upstream end 60A of the feed pipe 60 in the flowing direction of the coating liquid L is connected with a lower portion of the container 14. In this exemplary embodiment, the upstream end 60A of the feed pipe 60 is connected with the center of the recess 14B serving as the lowermost portion thereof. A downstream end 60B of the feed pipe 60 in the flowing direction of the coating liquid L extends through the housing 20 and is connected with the inflow section 46 of the rectifying device 40. Accordingly, the coating liquid L flowing through the feed pipe 60 is introduced to the second flow channel 45 in the rectifying device 40 via the inflow section 46. Then, the coating liquid L is fed from the second flow channel 45 of the rectifying device 40 to the flow channel 34 of the coating liquid retainer 12 via the first flow channel 43.

Furthermore, a viscosity measuring unit 66 that measures the viscosity of the coating liquid L is provided at an intermediate point of the feed pipe 60 located downstream of the pump 62 in the flowing direction of the coating liquid L. Moreover, a filter 68 that removes extraneous matter from the coating liquid L is provided at an intermediate point of the feed pipe 60 located upstream of the viscosity measuring unit 66 in the flowing direction of the coating liquid L.

In the coating apparatus 10, the pump 62 of the circulator 16 is driven so that the coating liquid L in the container 14 is fed to the rectifying device 40 via the feed pipe 60. Then, the coating liquid L is fed to the coating liquid retainer 12 by the rectifying device 40. In the coating liquid retainer 12, the coating liquid L is applied to the outer peripheral surface 100A of the cylindrical body 100. The coating liquid L falling downward along the outer peripheral surface 100A of the cylindrical body 100 is collected by the container 14. Then, the coating liquid L in the container 14 is fed to the rectifying device 40 via the feed pipe 60. Thus, the circulator 16 causes the coating liquid L in the container 14 to circulate to the coating liquid retainer 12 via the rectifying device 40.

Effects and Advantages

The effects and advantages of this exemplary embodiment will now be described.

The coating apparatus 10 is provided with the rectifying device 40 and the coating liquid retainer 12 disposed at the downstream side in the first flow channel 43 of the rectifying device 40 in the flowing direction of the coating liquid L. The coating liquid retainer 12 includes the upper opening 25 and the lower opening 28 and retains the coating liquid L. In the coating liquid retainer 12, the cylindrical body 100 extends through the upper opening 25 and the lower opening 28, and the cylindrical body 100 is relatively moved upward in the vertical direction, whereby the coating liquid L is applied to the outer peripheral surface 100A of the cylindrical body 100.

More specifically, as shown in FIG. 5A, the cylindrical body 100 is inserted in the direction of the arrow A from above the coating liquid retainer 12. As shown in FIG. 5B, the cylindrical body 100 is moved downward in the direction of the arrow A, and the coating liquid L is fed to the coating liquid retainer 12 by the circulator 16 (see FIG. 1), so that the space between the annular body 32 of the coating liquid retainer 12 and the outer peripheral surface 100A of the cylindrical body 100 is filled with the coating liquid L. Then, the cylindrical body 100 reaches the lowermost point.

Subsequently, as shown in FIG. 5C, the cylindrical body 100 is moved upward (i.e., in the direction of the arrow B) relative to the coating liquid retainer 12, and the coating liquid L is discharged from the discharge section 36 such that the coating liquid L overflows from the upper side. Accordingly, the coating liquid L flows out downward from the lower opening 28, so that the coating liquid L is applied to the outer peripheral surface 100A of the cylindrical body 100 located higher than the upper opening 25. Consequently, the coating film 102 (see FIG. 6B) is formed on the outer peripheral surface 100A of the cylindrical body 100.

The rectifying device 40 is provided upstream of the coating liquid retainer 12 in the flowing direction of the coating liquid L (see FIG. 1). As shown in FIG. 3, the rectifying device 40 includes the first flow channel member 42 having the annular first flow channel 43 that is provided between the inner peripheral wall 40A and the outer peripheral wall 40B and through which the coating liquid L flows in the axial direction. The rectifying device 40 also includes the second flow channel member 44 provided upstream of the first flow channel 43 in the flowing direction of the coating liquid L. The second flow channel member 44 has the second flow channel 45 that is provided between the inner peripheral wall 40A and the outer peripheral wall 40B and that connects with the first flow channel 43 along the entire circumference. The second flow channel member 44 is provided with the inflow section 46 that is provided in a circumferential area of the second flow channel 45 located away from the first flow channel 43 in the axial direction and into which the coating liquid L flows.

The rectifying device 40 also includes the first guide wall 50A provided in the second flow channel 45 at a position located away from the inflow section 46 in the circumferential direction. The coating liquid L flowing toward the first side in the circumferential direction (i.e., the direction of the arrow C1) through the second flow channel 45 is guided toward the first flow channel 43 by the first guide wall 50A. Furthermore, the rectifying device 40 includes the second guide wall 50B provided adjacent to the first guide wall 50A in the circumferential direction within the second flow channel 45. The second guide wall 50B extends in the direction intersecting the first guide wall 50A. The coating liquid L flowing toward the second side in the circumferential direction (i.e., the direction of the arrow C2) through the second flow channel 45 is guided toward the first flow channel 43 by the second guide wall 50B.

In the rectifying device 40, the first guide wall 50A and the second guide wall 50B are disposed to intersect with each other. Accordingly, at the merging section 50, the coating liquid L flowing in the direction of the arrow C1 along the first guide wall 50A and the coating liquid L flowing in the direction of the arrow C2 along the second guide wall 50B smoothly merge near the connection end 50C where the first guide wall 50A and the second guide wall 50B connect with each other. Specifically, the merging occurs in a state where the flow line of the coating liquid L flowing in the direction of the arrow C1 along the first guide wall 50A and the flow line of the coating liquid L flowing in the direction of the arrow C2 along the second guide wall 50B are nearly parallel to each other. Therefore, a collision between the coating liquid L flowing along the first guide wall 50A and the coating liquid L flowing along the second guide wall 50B is suppressed, so that a vortex occurring in the coating liquid L may be suppressed in the first flow channel 43 downstream of the connection end 50C.

Accordingly, in the rectifying device 40, a disturbance in the flow of the coating liquid L may be suppressed at the location where the coating liquid L flowing along the first guide wall 50A and the coating liquid L flowing along the second guide wall 50B merge, as compared with a case where the closed end opposite the first flow channel in the second flow channel has a flat shape extending along a plane perpendicular to the axis. Consequently, the flow of the coating liquid L to be fed to the coating liquid retainer 12 from the rectifying device 40 becomes stable, whereby variations in the flow rate of the coating liquid L may be suppressed in the circumferential direction of the discharge section 36 of the coating liquid retainer 12.

A coating apparatus 200 according to a first comparative example will now be described with reference to FIGS. 8 to 10.

Figure 8:
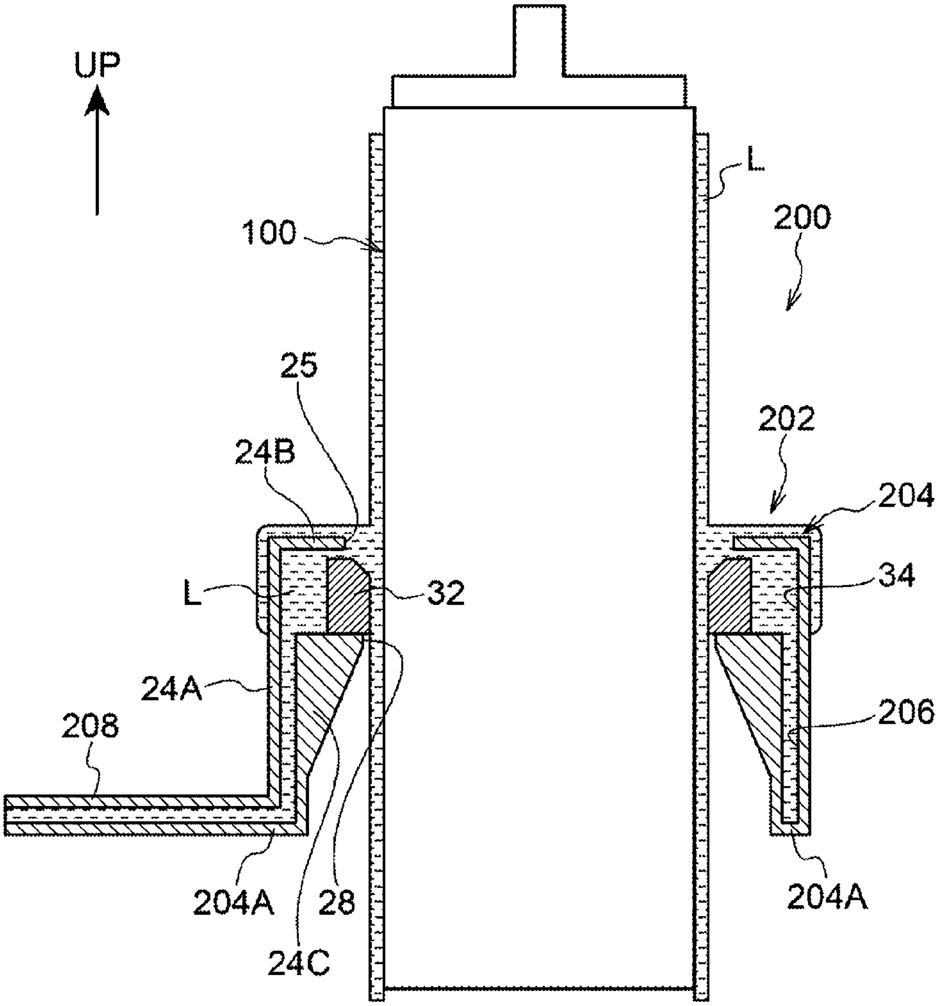
FIG. 8 is a cross-sectional view illustrating a relevant part of a coating apparatus according to a first comparative example.
Figure 9:
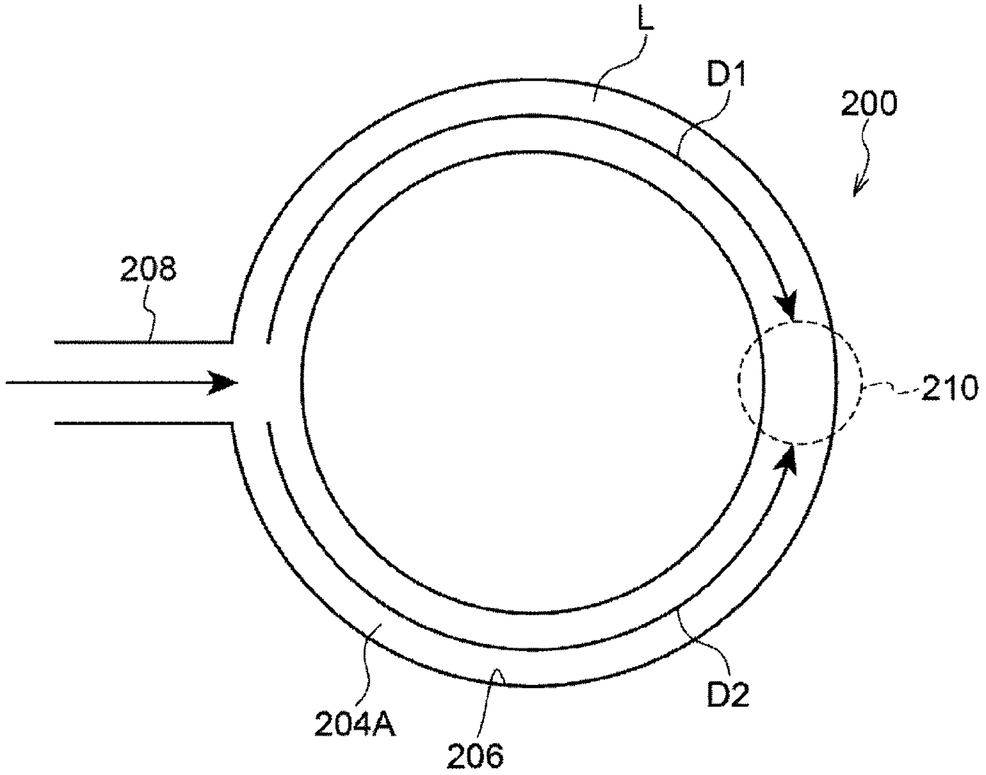
FIG. 9 is a plan view schematically illustrating a merging state of the coating liquid in the coating apparatus according to the first comparative example.

As shown in FIG. 8, the coating apparatus 200 includes a coating liquid retainer 202. The coating liquid retainer 202 includes a casing 204. The casing 204 includes a cylindrical section 24A, an upper wall 24B, and a block section 24C. Furthermore, the casing 204 includes a bottom wall 204A that connects the lower end of the cylindrical section 24A and the lower end of the block section 24C. A flow channel 206 that is provided along the entire circumference of the cylindrical section 24A and through which the coating liquid L flows in the axial direction is provided between the cylindrical section 24A and the block section 24C. The flow channel 206 is provided above the bottom wall 204A.

A tubular inflow section 208 into which the coating liquid L flows is connected with a circumferential area at the lower end of the cylindrical section 24A in the vertical direction. The downstream end of the inflow section 208 is connected with the upper side of the bottom wall 204A at the lower end of the cylindrical section 24A in the vertical direction. The bottom wall 204A is flat and extends horizontally in the circumferential direction of the cylindrical section 24A. In the coating apparatus 200, the coating liquid L flows into the flow channel 206 from the inflow section 208.

In the coating apparatus 200, the flat bottom wall 204A extending in the circumferential direction of the cylindrical section 24A is provided where the inflow section 208 is connected. Accordingly, as shown in FIGS. 9 and 10, the coating liquid L flowing into the flow channel 206 from the inflow section 208 flows toward a first side in the circumferential direction along the bottom wall 204A, as indicated by an arrow D1, and flows toward a second side in the circumferential direction along the bottom wall 204A, as indicated by an arrow D2. Thus, the coating liquid L flowing through the flow channel 206 in the direction of the arrow D1 and the coating liquid L flowing in the direction of the arrow D2 collide at a location 210 opposite the inflow section 208, possibly causing the flow rate of the coating liquid L to fluctuate and causing a vortex to occur in the coating liquid L. Therefore, in the coating liquid L in which particles disperse, there is a concern that flocculation of the particles may occur.

Figure 12:
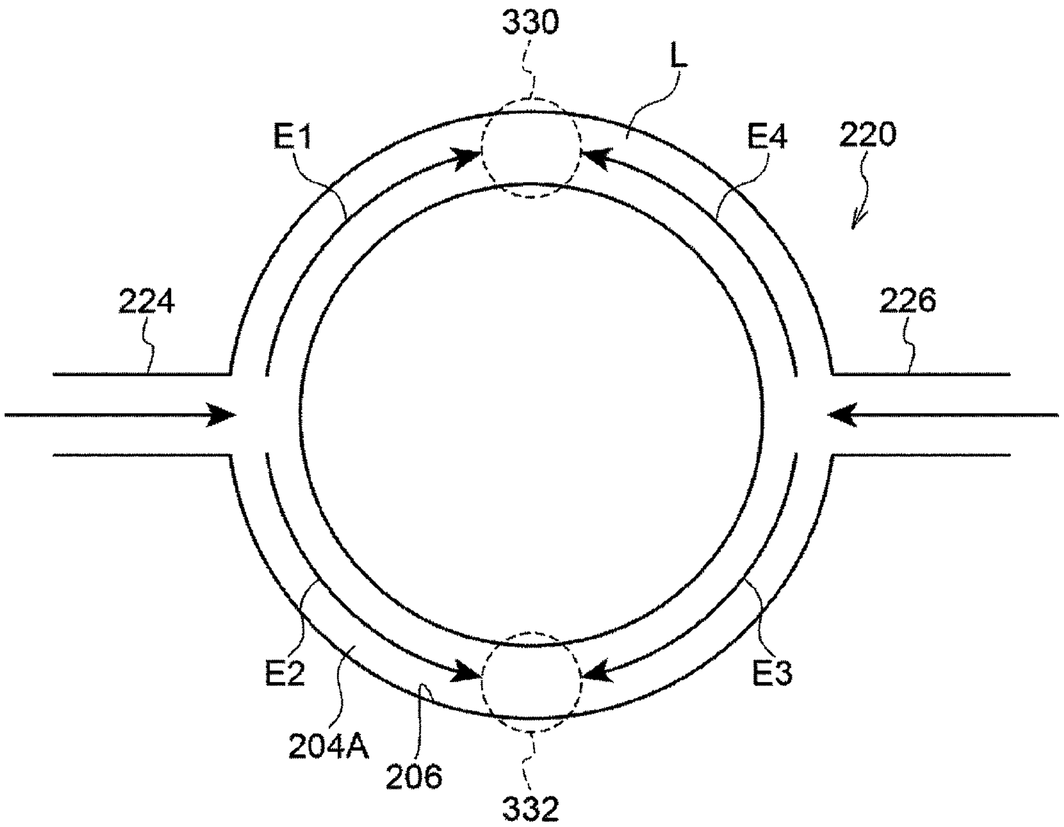
FIG. 12 is a plan view schematically illustrating a merging state of the coating liquid in the coating apparatus according to the second comparative example.
Figure 13:
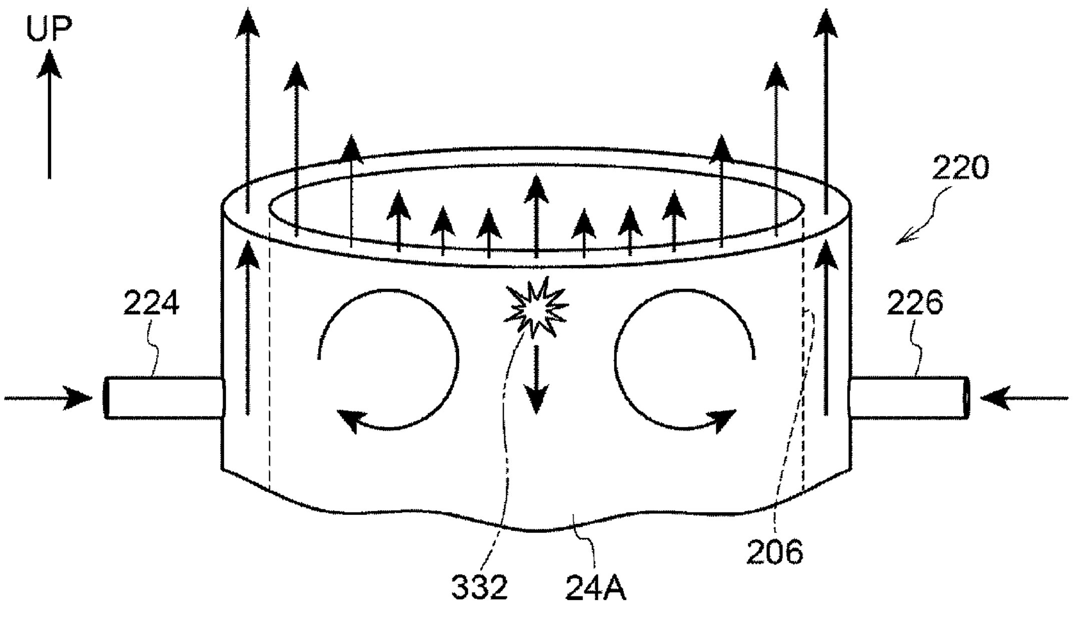
FIG. 13 is a perspective view schematically illustrating the merging state of the coating liquid in the coating apparatus according to the second comparative example.

A coating apparatus 220 according to a second comparative example will now be described with reference to FIGS. 11 to 13.

Figure 11:
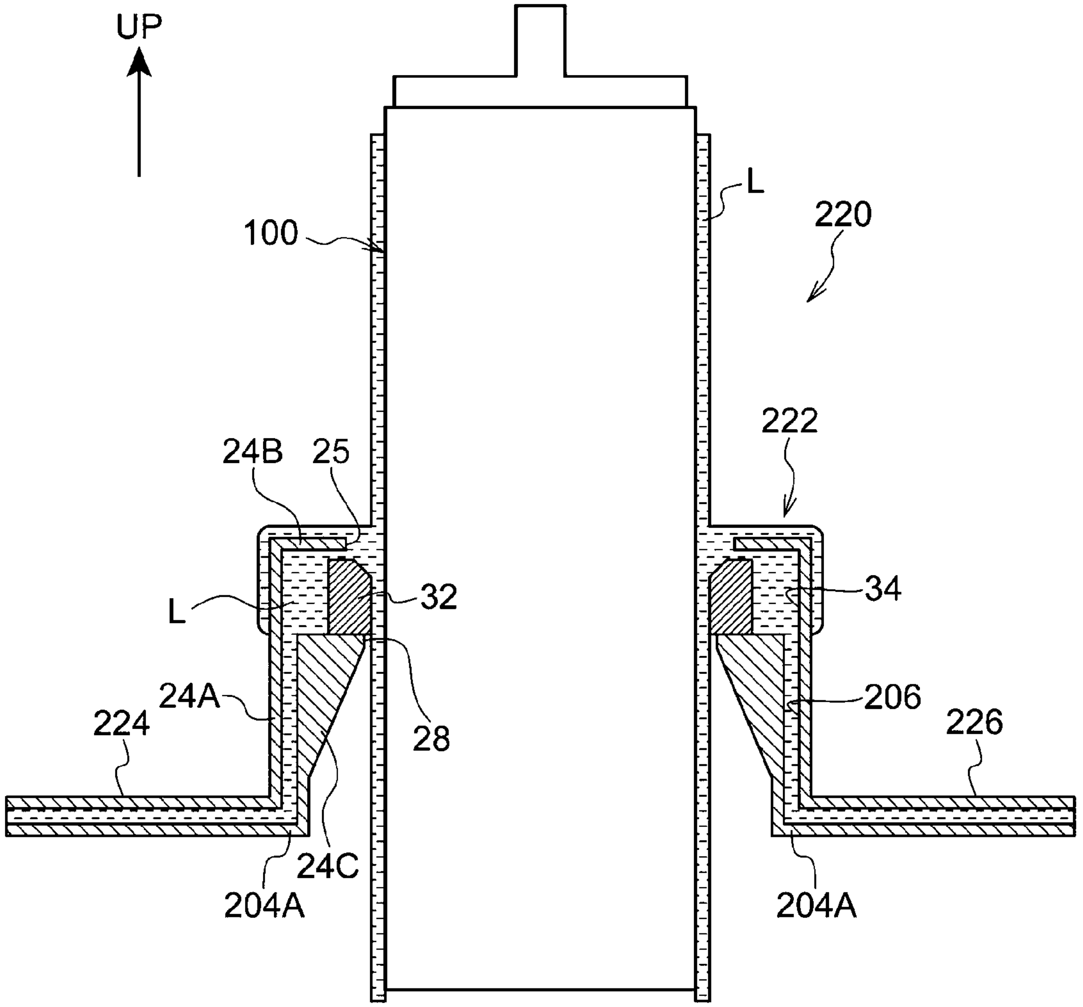
FIG. 11 is a cross-sectional view illustrating a relevant part of a coating apparatus according to a second comparative example.

As shown in FIG. 11, the coating apparatus 220 includes a coating liquid retainer 222. The coating liquid retainer 222 includes two inflow sections 224 and 226 that are disposed at the lower portion of the cylindrical section 24A in the axial direction and that are located opposite each other in the circumferential direction. The configuration of the coating apparatus 220 other than the inflow sections 224 and 226 is identical to that of the coating apparatus 200.

In the coating apparatus 220, the flat bottom wall 204A extending in the circumferential direction of the cylindrical section 24A is provided where the inflow sections 224 and 226 are connected. Accordingly, as shown in FIGS. 12 and 13, the coating liquid L flowing into the flow channel 206 from the inflow section 224 flows toward one side in the circumferential direction along the bottom wall 204A, as indicated by an arrow E1, and flows toward the other side in the circumferential direction along the bottom wall 204A, as indicated by an arrow E2. The coating liquid L flowing into the flow channel 206 from the inflow section 226 flows toward one side in the circumferential direction along the bottom wall 204A, as indicated by an arrow E3, and flows toward the other side in the circumferential direction along the bottom wall 204A, as indicated by an arrow E4. Thus, the coating liquid L flowing into the flow channel 206 from the inflow section 224 and the coating liquid L flowing into the flow channel 206 from the inflow section 226 collide at two intermediate locations 330 and 332 of the flow channel 206 in the circumferential direction, possibly causing the flow rate of the coating liquid L to fluctuate and causing a vortex to occur in the coating liquid L. Therefore, in the coating liquid L in which particles disperse, there is a concern that flocculation of the particles may occur.

In contrast, in the rectifying device 40 according to this exemplary embodiment, merging occurs in a state where the flow line of the coating liquid L flowing in the direction of the arrow C1 along the first guide wall 50A and the flow line of the coating liquid L flowing in the direction of the arrow C2 along the second guide wall 50B are nearly parallel to each other, so that a collision of the coating liquid L may be suppressed. Therefore, fluctuations in the flow rate of the coating liquid L may be suppressed, and a vortex occurring in the coating liquid L may be suppressed in the first flow channel 43 downstream of the connection end 50C. Accordingly, in the coating liquid L in which particles disperse, flocculation of the particles may be suppressed.

Furthermore, in the rectifying device 40, the angle θ formed between the lines 51A and 51B that connect the connection end 50C, where the first guide wall 50A and the second guide wall 50B connect with each other, to the point X on the first guide wall 50A and the point X' on the second guide wall 50B, respectively, at the positions corresponding to ¼ of the height H from the connection end 50C to the lowermost end of the inflow section 46 is set to 40° or smaller. Therefore, in the rectifying device 40, a disturbance in the flow of the coating liquid L may be suppressed at the merging location of the coating liquid L, as compared with a case where the angle formed between the lines 51A and 51B that connect the connection end, where the first guide wall and the second guide wall connect with each other, to the point X on the first guide wall and the point X' on the second guide wall, respectively, at the positions lower in height by ¼ of the height H from the connection end 50C to the lowermost end of the inflow section 46 is set to be larger than 40°.

Moreover, in the rectifying device 40, the angle θ formed between the lines 51A and 51B that connect the connection end 50C, where the first guide wall 50A and the second guide wall 50B connect with each other, to the point X on the first guide wall 50A and the point X' on the second guide wall 50B, respectively, at the positions corresponding to ¼ of the height H from the connection end 50C to the lowermost end of the inflow section 46 is set to 10° or smaller. Therefore, in the rectifying device 40, a disturbance in the flow of the coating liquid L may be suppressed at the merging location of the coating liquid L, as compared with a case where the angle formed between the lines 51A and 51B that connect the connection end, where the first guide wall and the second guide wall connect with each other, to the point X on the first guide wall and the point X' on the second guide wall, respectively, at the positions lower in height by ¼ of the height H from the connection end 50C to the lowermost end of the inflow section 46 is set to be larger than 10°.

Furthermore, the rectifying device 40 is provided with a single inflow section 46, a single first guide wall 50A, and a single second guide wall 50B. In the rectifying device 40, the coating liquid L flowing in from the inflow section 46 and flowing toward the first side in the circumferential direction (i.e., the direction of the arrow C1) through the second flow channel 45 is guided to the first guide wall 50A. Moreover, in the rectifying device 40, the coating liquid L flowing in from the inflow section 46 and flowing toward the second side in the circumferential direction (i.e., the direction of the arrow C2) through the second flow channel 45 is guided to the second guide wall 50B. Therefore, in the rectifying device 40 provided with a single inflow section, a disturbance in the flow of the coating liquid L may be suppressed at the location where the coating liquid L flowing along the first guide wall 50A and the coating liquid L flowing along the second guide wall 50B merge, as compared with a case where the closed end opposite the first flow channel in the second flow channel has a flat shape extending along a plane perpendicular to the axis.

Furthermore, the rectifying device 40 includes the cylindrical inner tube 52 serving as the inner peripheral wall 40A, the protrusion 48 integrated with the outer peripheral surface of the inner tube 52, and the cylindrical outer tube 54 into which the inner tube 52 is fitted and that serves as the outer peripheral wall 40B. The protrusion 48 is provided with the first guide wall 50A and the second guide wall 50B, and the first guide wall 50A and the second guide wall 50B protrude radially outward from the inner tube 52. In the state where the inner tube 52 is fitted in the outer tube 54, the protrusion 48 is in contact with the inner peripheral surface of the outer tube 54. Therefore, the rectifying device 40 may be fabricated readily, as compared with a case where the first guide wall and the second guide wall are separately provided between the inner tube and the outer tube in the rectifying device 40.

Moreover, the rectifying device 40 includes the inflow section 46 in the outer tube 54. Therefore, the rectifying device 40 may be fabricated readily, as compared with a case where the inflow section is provided in an area other than the outer tube in the rectifying device 40.

The coating apparatus 10 includes the rectifying device 40 and the coating liquid retainer 12 provided at the downstream side, in the flowing direction of the coating liquid L, in the first flow channel 43 of the rectifying device 40. The coating liquid retainer 12 allows the cylindrical body 100 to extend through the upper opening 25 and the lower opening 28 and causes the cylindrical body 100 to relatively move upward in the vertical direction, thereby applying the coating liquid L to the outer peripheral surface 100A of the cylindrical body 100. In the coating apparatus 10, the flow of the coating liquid L to be fed to the coating liquid retainer 12 from the rectifying device 40 becomes stable, whereby variations in the flow rate of the coating liquid L may be suppressed in the circumferential direction of the discharge section 36 of the coating liquid retainer 12.

Accordingly, in the coating apparatus 10 provided with the coating liquid retainer 12, a defect in the coating film 102 of the outer peripheral surface 100A of the cylindrical body 100 may be suppressed, as compared with a case where the closed end opposite the first flow channel in the second flow channel has a flat shape extending along a plane perpendicular to the axis.

A coating method for applying the coating liquid L by using the coating apparatus 10 includes allowing the coating liquid L to flow in from the inflow section 46 and guiding the coating liquid L flowing toward the first side in the circumferential direction (i.e., the direction of the arrow C1) through the second flow channel 45 toward the first flow channel 43 along the first guide wall 50A, allowing the coating liquid L to flow in from the inflow section 46 and guiding the coating liquid L flowing toward the second side in the circumferential direction (i.e., the direction of the arrow C2) through the second flow channel 45 toward the first flow channel 43 along the second guide wall 50B, and feeding the coating liquid L merging at the first flow channel 43 to the coating liquid retainer 12. The coating method for applying the coating liquid L by using the coating apparatus 10 also includes moving the cylindrical body 100 upward in the vertical direction relative to the coating liquid retainer 12 so as to apply the coating liquid L to the outer peripheral surface 100A of the cylindrical body 100 from the coating liquid retainer 12. Accordingly, in the coating method, a defect in the coating film 102 of the outer peripheral surface 100A of the cylindrical body 100 may be suppressed, as compared with a case where the closed end opposite the first flow channel in the second flow channel has a flat shape extending along a plane perpendicular to the axis.

Furthermore, in the coating method for applying the coating liquid L by using the coating apparatus 10, the cylindrical body 100 is a cylindrical member or is formed by wrapping an endless-belt-like member around a cylindrical core. Therefore, in the coating method, a defect in the coating film 102 of the outer peripheral surface 100A of the cylindrical member or the endless-belt-like member may be suppressed, as compared with a case where the closed end opposite the first flow channel in the second flow channel has a flat shape extending along a plane perpendicular to the axis.

In a photoconductor manufacturing method for manufacturing a photoconductor by using the above-described coating method, the cylindrical body 100 is a metallic cylindrical member or is formed by wrapping a metallic endless-belt-like member around a cylindrical core, and the coating liquid L contains a photoconductive material. Therefore, with the photoconductor manufacturing method, a defect in a coating film on the outer peripheral surface of the photoconductor may be suppressed, as compared with a case where the closed end opposite the first flow channel in the second flow channel has a flat shape extending along a plane perpendicular to the axis.

Second Exemplary Embodiment

A rectifying device 120 according to a second exemplary embodiment will now be described with reference to FIG. 7. Components identical to those in the first exemplary embodiment described above are given the same reference signs, and descriptions thereof will be omitted.

Figure 7:
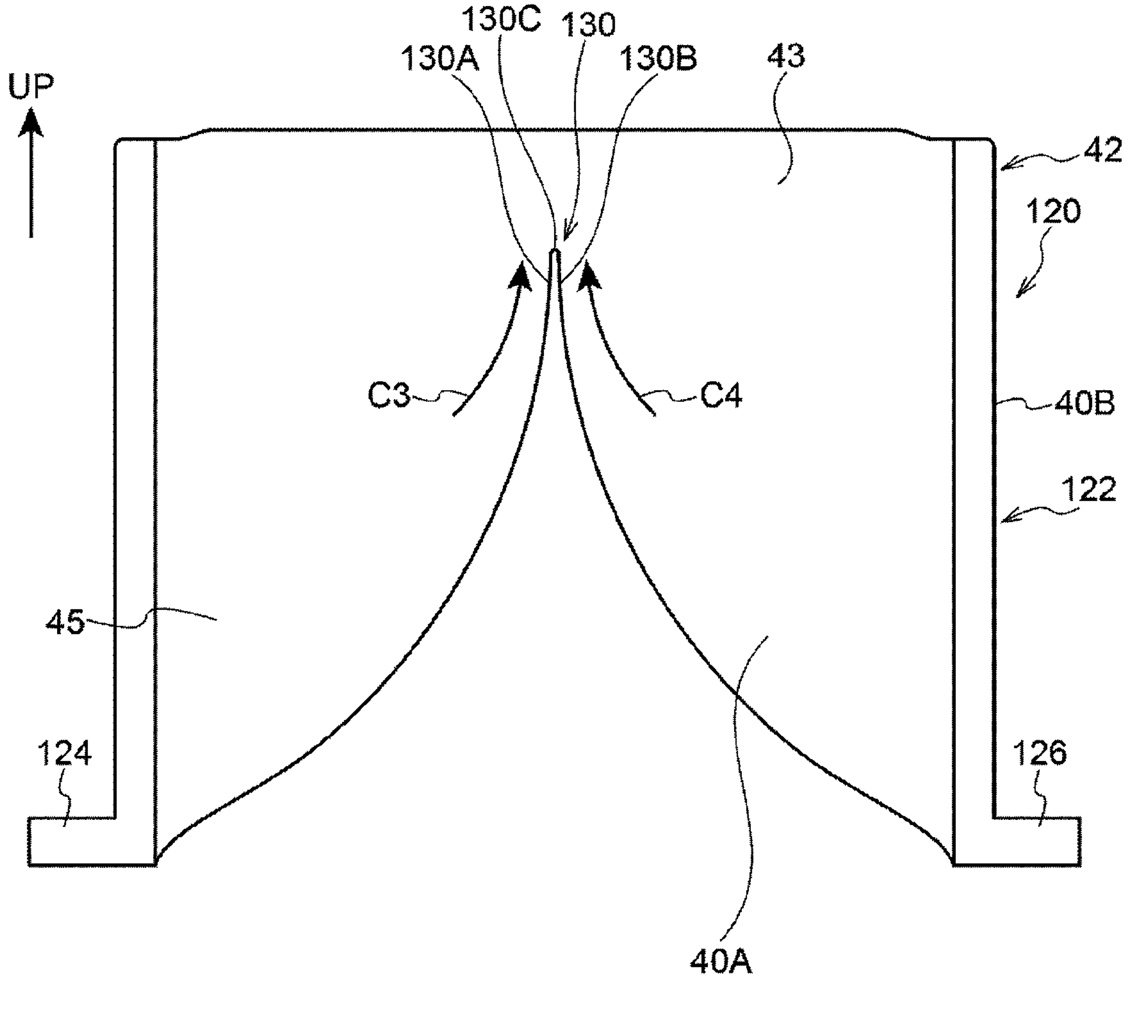
FIG. 7 is a side view schematically illustrating a rectifying device according to a second exemplary embodiment.

As shown in FIG. 7, the rectifying device 120 includes a first flow channel member 42 and a second flow channel member 122 disposed upstream of the first flow channel member 42 in the flowing direction of the coating liquid L. The second flow channel member 122 is provided with two inflow sections 124 and 126 opposite each other in the circumferential direction of the outer peripheral wall 40B. In the second flow channel member 122, the coating liquid L flows into the second flow channel 45 from the inflow sections 124 and 126. Furthermore, in the second flow channel member 122, the multiple (i.e., two in this exemplary embodiment) inflow sections 124 and 126 are each provided with a first guide wall 130A and a second guide wall 130B.

Specifically, a merging section 130 is provided in each area between the inflow section 124 and the inflow section 126 in the circumferential direction of the outer peripheral wall 40B. In order to simplify the configuration in FIG. 7, only the merging section 130 at the front side in FIG. 7 is shown, whereas the merging section 130 at the rear side in FIG. 7 is omitted. Each merging section 130 is provided with a first guide wall 130A that guides the coating liquid L flowing toward a first side in the circumferential direction (i.e., a direction indicated by an arrow C3) through the second flow channel 45, and a second guide wall 130B that guides the coating liquid L flowing toward a second side in the circumferential direction (i.e., a direction indicated by an arrow C4) through the second flow channel 45. At the merging section 130, the first guide wall 130A and the second guide wall 130B are disposed adjacent to each other, and a connection end 130C where the first guide wall 130A and the second guide wall 130B connect with each other is provided. The second guide wall 130B extends in a direction intersecting the first guide wall 130A. The connection end 130C is provided at a 90° position from the inflow section 124 and the inflow section 126 in the circumferential direction of the second flow channel member 122.

An angle θ formed between lines that connect the connection end 130C, where the first guide wall 130A and the second guide wall 130B connect with each other, to a point on the first guide wall 130A and a point on the second guide wall 130B, respectively, at positions corresponding to ¼ of the height H from the connection end 130C to the lowermost end of the inflow section 46 is desirably 40° or smaller, more desirably 30° or smaller, and even more desirably 10° or smaller. In this exemplary embodiment, the angle θ is set to, for example, 10°.

In the second flow channel member 122, the coating liquid L flowing in from the inflow section 124 as one of the neighboring inflow sections and flowing toward the first side in the circumferential direction (i.e., the direction of the arrow C3) through the second flow channel 45 is guided to the first guide wall 130A. Furthermore, the coating liquid L flowing in from the other inflow section 126 neighboring the inflow section 124 and flowing toward the second side in the circumferential direction (i.e., the direction of the arrow C4) through the second flow channel 45 is guided to the second guide wall 130B. Then, the coating liquid L merges at the connection end 130C where the first guide wall 130A and the second guide wall 130B connect with each other. Other components of the rectifying device 120 are identical to those of the rectifying device 40 according to the first exemplary embodiment.

The rectifying device 120 described above has a configuration similar to that of the rectifying device 40 according to the first exemplary embodiment, so that similar effects and advantages may be achieved.

In the rectifying device 120, the second flow channel member 122 is provided with two inflow sections 124 and 126, and the two inflow sections 124 and 126 are each provided with a first guide wall 130A and a second guide wall 130B. Therefore, in the rectifying device 120 provided with two or more inflow sections, a disturbance in the flow of the coating liquid L may be suppressed at the locations where the coating liquid L flowing along the first guide walls 130A and the coating liquid L flowing along the second guide walls 130B merge, as compared with a case where the closed end opposite the first flow channel in the second flow channel has a flat shape extending along a plane perpendicular to the axis.

Supplemental Remarks

In the first and second exemplary embodiments, the components constituting the rectifying device are changeable so long as the rectifying device is capable of rectifying the flow of the coating liquid L. The shapes of the first guide wall and the second guide wall are changeable so long as the first guide wall and the second guide wall intersect with each other. For example, the first guide wall and the second guide wall may be linear. Furthermore, although the protrusion 48 is provided on the inner tube 52 in the first exemplary embodiment, the protrusion may alternatively be provided on the outer tube. Moreover, the protrusion may be an independent component from the inner tube or the outer tube. In another alternative configuration, three inflow sections may be provided, and a merging section may be provided between inflow sections of each neighboring pair.

In the first and second exemplary embodiments, the components constituting the coating liquid retainer 12 are changeable so long as the coating liquid L may be applied to the outer peripheral surface 100A of the cylindrical body 100.

Although specific exemplary embodiments of the present disclosure have been described in detail above, the exemplary embodiments of the present disclosure are not limited to the above exemplary embodiments. It is obvious to a skilled person that other various exemplary embodiments are possible within the scope of the exemplary embodiments of the present disclosure.

EXAMPLES

The coating apparatus and the coating method according to the exemplary embodiments of the present disclosure will be described below in further detail with reference to examples. However, the coating apparatus and the coating method according to the exemplary embodiments of the present disclosure are not to be limited to the following examples so long as they do not depart from the gist of the exemplary embodiments of the present disclosure.

As Example 1, the coating liquid L is applied to the outer peripheral surface 100A of the cylindrical body 100 while varying the angle of the slope surface of the annular body relative to the vertical direction, and variations in the film thickness of the coating film are evaluated.

Example 1

Preparation of Coating Liquid

Preparation of Metal-Oxide Particles A

A mixture is obtained by agitating and mixing 100 parts by weight of zinc oxide (i.e., a sample having an average particle diameter of 70 μm and manufactured by Tayca Corporation) with 450 parts by weight of toluene and 50 parts by weight of methanol, and then by adding thereto 0.25 parts by weight of a silane coupling agent (i.e., KBM-603 manufactured by Shin-Etsu Chemical Co., Ltd.). The mixture then undergoes a dispersion process for one hour in a sand grinder mill. Subsequently, the toluene is distilled under reduced pressure. The mixture is baked for two hours at 150° C. and then cooled to room temperature, and is subsequently crushed, whereby a surface-treated zinc oxide is obtained.

Preparation of Coating Liquid

A mixture is obtained by mixing 33 parts by weight of metal-oxide particles A, 6 parts by weight of blocked isocyanate (i.e., Sumidur 3175 manufactured by Sumitomo Bayer Urethane Co., Ltd.), and 25 parts by weight of methyl ethyl ketone for 30 minutes. Then, 5 parts by weight of butyral resin (i.e., S-LEC BM-1 manufactured by Sekisui Chemical Co., Ltd.), 3 parts by weight of silicone balls (i.e., Tospearl 145 manufactured by Toshiba Silicones Co., Ltd.), and 0.01 parts by weight of a leveling agent (i.e., silicone oil SH29PA manufactured by Toray Dow Corning Silicone Co., Ltd.) are added to the aforementioned liquid mixture. The mixture then undergoes a dispersion process for two hours in a sand mill, whereby the coating liquid L is obtained.

By using an RE500H viscometer (manufactured by Toki Sangyo Co., Ltd) under conditions where a standard cone (1° 34') is used, the temperature is 25° C., and the shear rate is 100 $s^{-1}$, the viscosity of the coating liquid L is measured to be 100 mPa·s.

Coating Process

A coating process is performed by using the coating apparatus shown in FIG. 1, the aforementioned coating liquid L, and a ϕ84×340 mm aluminum pipe as the cylindrical body 100. The coating liquid L is constantly circulated and fed to the coating liquid retainer 12 at 0.4 L per minute, and to the cylindrical body 100 below the upper opening 25 at 0.4 L per minute. Then, while constantly circulating and feeding the coating liquid L, an upper inner surface of the cylindrical body 100 is gripped with a gripper (not shown), and the cylindrical body 100 is inserted from directly above into the upper opening 25 provided in the coating liquid retainer 12 at a constant rate of 500 mm per minute. The coating liquid L completely fills the coating liquid retainer 12 and overflows therefrom before the cylindrical body 100 reaches the lowermost point.

Subsequently, the cylindrical body 100 is lifted at a constant rate of 250 mm per minute, whereby the coating film 102 is formed on the outer peripheral surface 100A of the cylindrical body 100. While the cylindrical body 100 moves upward and downward through the upper opening 25, the coating liquid L discharged from the slit-like discharge section 36 provided in the upper opening 25 covers the entire circumference of the outer peripheral surface 100A of the cylindrical body 100 below the upper opening 25, and falls downward along the outer peripheral surface 100A of the cylindrical body 100 due to gravity. A sample obtained as a result of applying the coating liquid L to the cylindrical body 100 (i.e., a sample having the coating film 102 formed over the outer peripheral surface 100A of the cylindrical body 100) is hot-air dried at 170° C. for 40 minutes.

The rectifying device used is the rectifying device 40 shown in, for example, FIG. 3. The angle θ formed between the two lines that connect the connection end at the merging section of the rectifying device to the point on the first guide wall and the point on the second guide wall, respectively, located at ¼ of the height from the connection end to the lowermost end of the inflow section is set to 3°. In this example of the present disclosure, the angle θ formed between the two lines that connect the connection end to the point on the first guide wall and the point on the second guide wall, respectively, located at ¼ of the height H from the connection end to the lowermost end of the inflow section is the angle θ formed between the two lines that connect the connection end, where the first guide wall and the second guide wall connect with each other, to the point on the first guide wall and the point on the second guide wall, respectively, at the positions lower in height by ¼ of the height H from the connection end to the lowermost end of the inflow section. In a case where the angle θ is set to 3°, the direction of the flow-rate vector of the coating liquid L flowing along the first guide wall is the same as the direction of the flow-rate vector of the coating liquid L flowing along the second guide wall. The effect that the outer peripheral surface 100A of the cylindrical body 100 at the merging section has on the quality of the coating film is evaluated based on the number of defects (i.e., a density difference in the coating film) detected in the coating film per unit area by using an automatic surface inspection device. Evaluation results with respect to the quality of the coating film on the outer peripheral surface 100A of the cylindrical body 100 are indicated in Table 1.

Example 2

The angle θ formed between the two lines that connect the connection end at the merging section of the rectifying device to the point on the first guide wall and the point on the second guide wall, respectively, is set to 5°, and the coating process is performed by using the coating liquid L in a manner similar to Example 1.

Example 3

The angle θ formed between the two lines that connect the connection end at the merging section of the rectifying device to the point on the first guide wall and the point on the second guide wall, respectively, is set to 10°, and the coating process is performed by using the coating liquid L in a manner similar to Example 1.

Example 4

The angle θ formed between the two lines that connect the connection end at the merging section of the rectifying device to the point on the first guide wall and the point on the second guide wall, respectively, is set to 20°, and the coating process is performed by using the coating liquid L in a manner similar to Example 1.

Example 5

The angle θ formed between the two lines that connect the connection end at the merging section of the rectifying device to the point on the first guide wall and the point on the second guide wall, respectively, is set to 30°, and the coating process is performed by using the coating liquid L in a manner similar to Example 1.

Example 6

The angle θ formed between the two lines that connect the connection end at the merging section of the rectifying device to the point on the first guide wall and the point on the second guide wall, respectively, is set to 40°, and the coating process is performed by using the coating liquid L in a manner similar to Example 1.

Example 7

The angle θ formed between the two lines that connect the connection end at the merging section of the rectifying device to the point on the first guide wall and the point on the second guide wall, respectively, is set to 50°, and the coating process is performed by using the coating liquid L in a manner similar to Example 1.

Example 8

The angle θ formed between the two lines that connect the connection end at the merging section of the rectifying device to the point on the first guide wall and the point on the second guide wall, respectively, is set to 60°, and the coating process is performed by using the coating liquid L in a manner similar to Example 1.

Comparative Example 1

Figure 10:
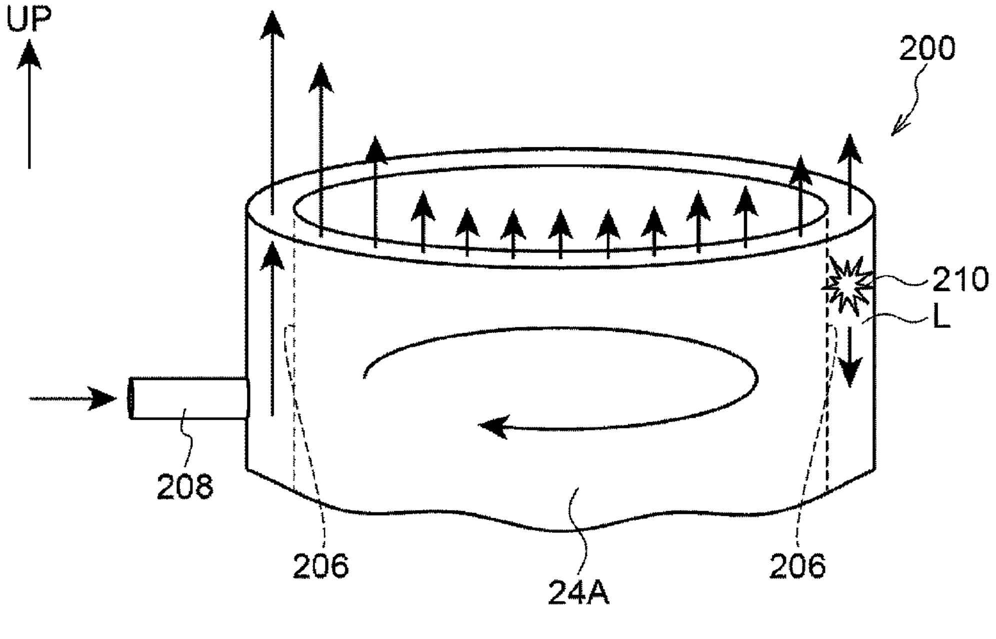
FIG. 10 is a perspective view illustrating the merging state of the coating liquid in the coating apparatus according to the first comparative example.

A configuration not provided with a rectifying device is prepared, as shown in FIG. 10, and the coating process is performed by using the coating liquid L in a manner similar to Example 1 (i.e., the angle θ is not measurable).

With regard to the number of defects detected in the coating film on the outer peripheral surface 100A of the cylindrical body 100, a result where the number of defects detected is one or fewer is indicated as “A” for excellent, a result where two to seven defects inclusive are detected is indicated as “B” for good, a result where eight to 35 defects inclusive are detected is indicated as “C” for fair due to having a slightly large number of defects, and a result where 36 or more defects are detected is indicated as “D” for poor.

Table 1 shows the evaluation results with respect to the quality of the coating film on the outer peripheral surface 100A of the cylindrical body 100.

TABLE 1

| | ANGLE θ | NUMBER OF DEFECTS DETECTED | RESULT |
|---|---|---|---|
| EXAMPLE 1 | 3 | 0 | A |
| EXAMPLE 2 | 5 | 1 | A |
| EXAMPLE 3 | 10 | 2 | B |
| EXAMPLE 4 | 20 | 4 | B |
| EXAMPLE 5 | 30 | 5 | B |
| EXAMPLE 6 | 40 | 7 | B |
| EXAMPLE 7 | 50 | 19 | C |
| EXAMPLE 8 | 60 | 35 | C |
| COMPARATIVE EXAMPLE 1 | | 98 | D |

As shown in Table 1, it is confirmed that, when the angle θ formed between the two lines that connect the connection end at the merging section of the rectifying device to the point on the first guide wall and the point on the second guide wall, respectively, is 60° or smaller, the number of defects detected in the coating film on the outer peripheral surface 100A of the cylindrical body 100 is smaller than that in the configuration according to the comparative example in which a rectifying device is not provided. It is also confirmed that, when the angle θ formed between the two lines that connect the connection end at the merging section of the rectifying device to the point on the first guide wall and the point on the second guide wall, respectively, is 40° or smaller, the number of defects detected in the coating film on the outer peripheral surface 100A of the cylindrical body 100 is very small.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A rectifying device comprising:

a first flow channel member that has an annular first flow channel through which a fluid flows in an axial direction, the first flow channel being provided between an inner peripheral wall and an outer peripheral wall;

a second flow channel member that has a second flow channel between the inner peripheral wall and the outer peripheral wall, the second flow channel being provided upstream of the first flow channel in a flowing direction of the fluid and being connected with the first flow channel along an entire circumference;

an inflow section that is provided at the second flow channel member and that allows the fluid to flow into a circumferential area of the second flow channel located away from the first flow channel in the axial direction;

a first guide wall that is provided within the second flow channel at a position located away from the inflow section in a circumferential direction and that guides the fluid flowing toward a first side in the circumferential direction through the second flow channel toward the first flow channel; and a second guide wall that is provided within the second flow channel at a position adjacent to the first guide wall in the circumferential direction, the second guide wall guiding the fluid flowing toward a second side in the circumferential direction through the second flow channel toward the first flow channel and being disposed in a direction intersecting the first guide wall, wherein an angle formed between lines that connect a connection end to a point on the first guide wall and a point on the second guide wall that are located at ¼ of a height from the connection end to a lower end of the inflow section is set to 40° or smaller, the connection end being where the first guide wall and the second guide wall connect with each other.

2. The rectifying device according to claim 1, wherein the angle formed between the lines that connect the connection end to the point on the first guide wall and the point on the second guide wall that are located at ¼ of the height from the connection end to a lowermost end of the inflow section is set to 10° or smaller, the connection end being where the first guide wall and the second guide wall connect with each other.

3. The rectifying device according to claim 1, wherein the inflow section includes a single inflow section, and the first guide wall and the second guide wall include a single first guide wall and a single second guide wall, respectively, wherein the fluid flowing in from the inflow section and flowing toward the first side in the circumferential direction through the second flow channel is guided to the first guide wall, and wherein the fluid flowing in from the inflow section and flowing toward the second side in the circumferential direction through the second flow channel is guided to the second guide wall.

4. A rectifying device comprising:

a first flow channel member that has an annular first flow channel through which a fluid flows in an axial direction, the first flow channel being provided between an inner peripheral wall and an outer peripheral wall;

a second flow channel member that has a second flow channel between the inner peripheral wall and the outer peripheral wall, the second flow channel being provided upstream of the first flow channel in a flowing direction of the fluid and being connected with the first flow channel along an entire circumference;

an inflow section that is provided at the second flow channel member and that allows the fluid to flow into a circumferential area of the second flow channel located away from the first flow channel in the axial direction;

a first guide wall that is provided within the second flow channel at a position located away from the inflow section in a circumferential direction and that guides the fluid flowing toward a first side in the circumferential direction through the second flow channel toward the first flow channel; and a second guide wall that is provided within the second flow channel at a position adjacent to the first guide wall in the circumferential direction, the second guide wall guiding the fluid flowing toward a second side in the circumferential direction through the second flow channel toward the first flow channel and being disposed in a direction intersecting the first guide wall wherein the inflow section includes two or more inflow sections, and each of the inflow sections is provided with the first guide wall and the second guide wall, wherein the fluid flowing in from one of the inflow sections of a neighboring pair and flowing toward the first side in the circumferential direction through the second flow channel is guided to the first guide wall, and wherein the fluid flowing in from another one of the inflow sections of the neighboring pair and flowing toward the second side in the circumferential direction through the second flow channel is guided to the second guide wall adjacent to the first guide wall.

5. The rectifying device according to claim 1, further comprising:

a cylindrical inner tube that serves as the inner peripheral wall in the first flow channel member and the second flow channel member;

a protrusion that is integrated with an outer peripheral surface of the inner tube and is configured such that the first guide wall and the second guide wall protrude radially outward from the inner tube; and a cylindrical outer tube that receives the inner tube therein, has an inner peripheral surface that comes into contact with the protrusion, and serves as the outer peripheral wall in the first flow channel member and the second flow channel member.

6. The rectifying device according to claim 5, wherein the outer tube includes the inflow section.

7. A coating apparatus comprising:

the rectifying device according to claim 1 in which the fluid is a coating liquid to be applied to a cylindrical body; and a coating liquid retainer that is provided at a downstream side in the first flow channel of the rectifying device in a flowing direction of the coating liquid, the coating liquid retainer including an upper opening and a lower opening and retaining the coating liquid, the coating liquid retainer allowing the cylindrical body to extend through the upper opening and the lower opening and causing the cylindrical body to relatively move upward in a vertical direction so as to apply the coating liquid to an outer peripheral surface of the cylindrical body.

8. A coating method for applying a coating liquid by using the coating apparatus according to claim 7, the coating method comprising:

allowing the coating liquid to flow in from the inflow section and guiding the coating liquid flowing toward the first side in the circumferential direction through the second flow channel toward the first flow channel along the first guide wall, allowing the coating liquid to flow in from the inflow section and guiding the coating liquid flowing toward the second side in the circumferential direction through the second flow channel toward the first flow channel along the second guide wall, and feeding the coating liquid merging at the first flow channel to the coating liquid retainer; and moving the cylindrical body upward in the vertical direction relative to the coating liquid retainer so as to apply the coating liquid from the coating liquid retainer to the outer peripheral surface of the cylindrical body.

9. The coating method according to claim 8, wherein the angle formed between the lines that connect the connection end to the point on the first guide wall and the point on the second guide wall that are located at ¼ of the height from the connection end to a lowermost end of the inflow section is set to 10° or smaller, the connection end being where the first guide wall and the second guide wall connect with each other.

10. The coating method according to claim 8, wherein the cylindrical body is a cylindrical member or is formed by wrapping an endless-belt-like member around a cylindrical core.

* * * * *